July 10, 1934.   I. J. CLARK   1,966,164
TRAVELING REFRIGERATOR
Filed Jan. 8, 1934   2 Sheets-Sheet 1
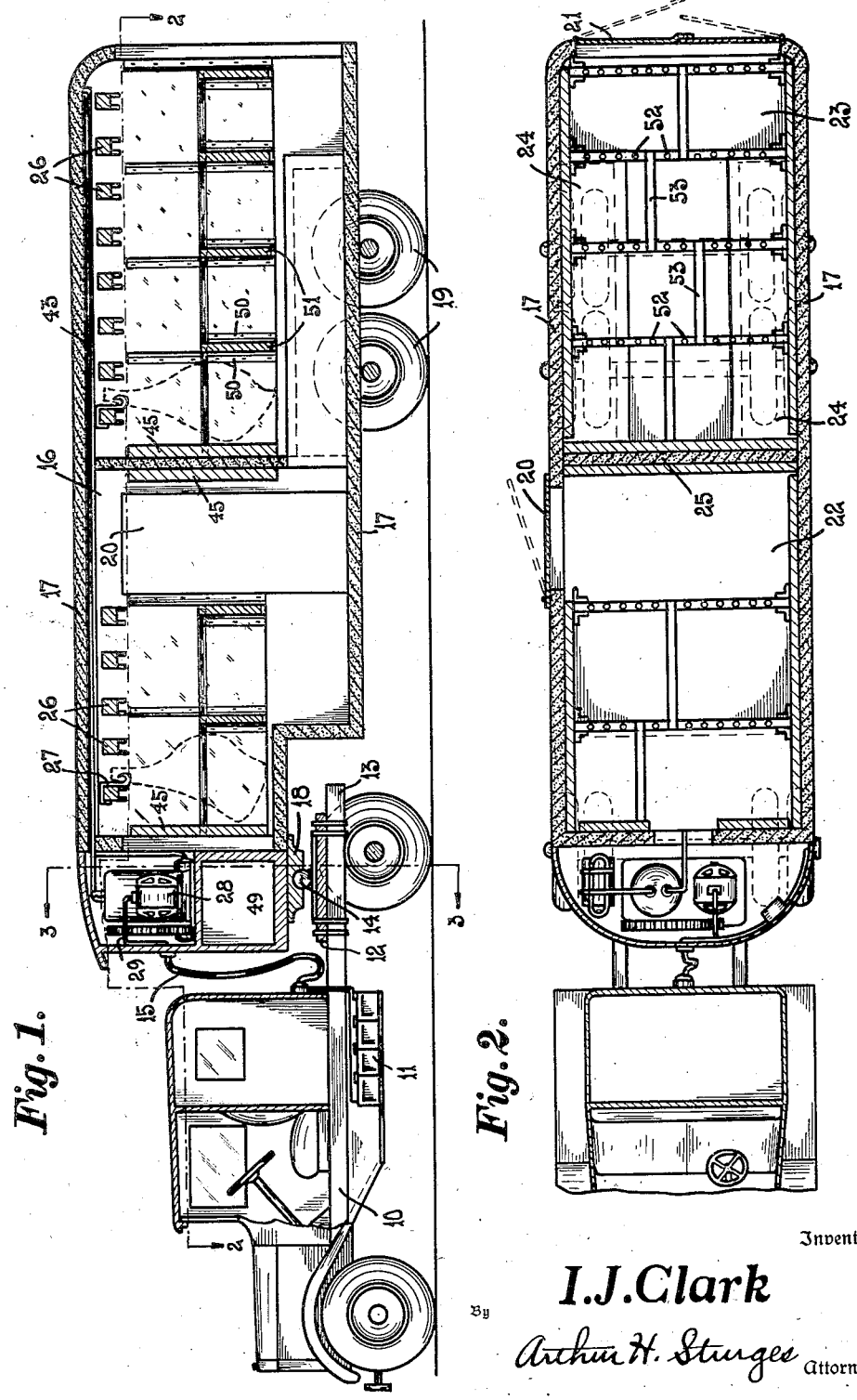
Inventor
I. J. Clark
By Arthur H. Sturges, Attorney July 10, 1934.    I. J. CLARK    1,966,164
TRAVELING REFRIGERATOR
Filed Jan. 8, 1934    2 Sheets-Sheet 2

Inventor
*I. J. Clark*
By Arthur H. Sturges.
Attorney

Patented July 10, 1934

1,966,164

UNITED STATES PATENT OFFICE 1,966,164

TRAVELING REFRIGERATOR

Isaac J. Clark, Denver, Colo.

Application January 8, 1934, Serial No. 705,723

2 Claims. (Cl. 62—117)

This invention relates to the art of refrigeration primarily and more particularly to a traveling refrigerator and has for an object to provide refrigerating means for transporting merchandise and particularly perishable goods such as meats, fruits, vegetables and the like together with valuables.

Another object of the invention is to provide a light, strong refrigerating vehicle so arranged that it is adapted to compactly store said merchandise for transportation in an accessible manner whereby the same may be readily removed upon reaching a point of destination.

A further object of the invention is to provide a refrigerating trailer vehicle for use in connection with a truck, the latter to provide energy for operating the refrigerating machinery.

A still further object is the provision of a trailer refrigerator so arranged that the refrigerating mechanism may be electrically energized while standing at a loading dock and disconnected from its towing truck.

Other and further objects and advantages of the invention will be understood from the following detailed description thereof, reference being had to the accompanying drawings in which:

Figure 1 is a vertical section of the invention taken longitudinally thereof.

Figure 2 is a sectional plan view taken on the dotted line 2—2 of Figure 1.

Figure 4:
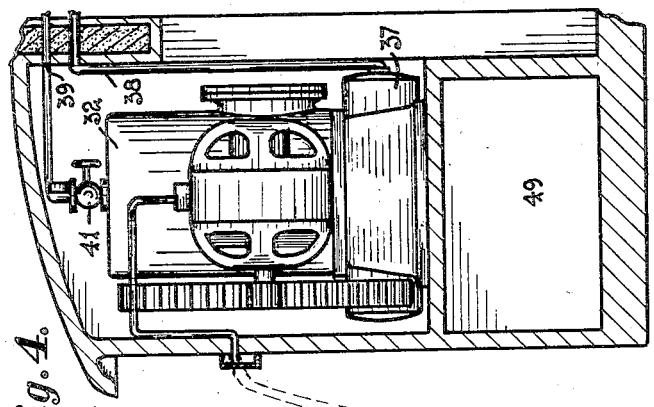
Figure 4 is a vertical section of a fragment of the forward compartment taken longitudinally of the trailer and substantially on the dotted line 4—4 of Figure 3.
Figure 6:
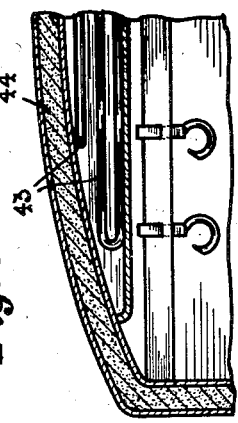
Figure 6 is an enlarged detail showing a cross section of a fragment of a roof of the vehicle.

Referring now to the drawings for a more particular description the numeral 10 indicates a self-propelled truck carrying batteries 11 in electrical communication with the generator of the engine thereof and having a clear platform 12 provided rearwardly upon the frame 13 of the truck. Upon the platform 12 a ball 14 is permanently positioned by any suitable means and functions as a pivotal point for swingable movements between the truck and a later described trailer section.

An electrical conduit 15 is in electrical communication with the battery 11 and adapted to supply energy for a later described motor positioned within the trailer at times when the latter is being towed by the truck during the transportation of merchandise, the said motor being adapted to be placed in electrical communication with a further suitable source of electrical energy at times when the trailer is positioned at a loading dock as later described.

The refrigerating trailer section indicated at 16 includes any suitable arrangement of a light, strong frame and covering thereof, it being essential that insulation 17 be provided and incorporated into said frame at the bottom, the roof, side walls and other later mentioned parts of the trailer.

It will be understood that the forward end of the frame is supported by and attached to the journal bearing 18 which members with the ball 14 carried by the truck for pivotally supporting the forward end of the trailer, the latter having a drop frame construction, as shown in Figure 1, permitting a member of the comparatively high ball and the bearing 18 while conserving interior space by permitting the main portion of the bottom of the trailer to be closely adjacent to the roadway. Preferably a plurality of pairs of rear wheels 19 are employed in accordance with the weight and capacity of the trailer.

A side wall of the trailer is preferably provided with a door 20 and the rear wall with a pair of doors 21, the former opening into a compartment 22 particularly adapted for transporting quarters of beef and the like meat carcasses and the latter opening into a compartment 23 in which fruits and vegetables or the like small merchandise is preferably stored for transportation, a portion of the latter compartment being occupied by the housings 24 provided for the reception of the rear wheels 19. The compartments 22 and 23 are provided by means of a transversely disposed divisional wall 25 whereby the compartments are insulated, the one from the other and adapted to receive different degrees of temperature, said partition 25 also functioning as a reinforcing truss for bracing the elongated trailer body against twisting stresses incident to road travel.

Elongated meat carcasses are preferably stored in the compartment 22, the arrangement of the latter providing more clear floor space and vertical space in which to suspend the same from meat hooks. Adjacent the roof of the trailer transversely disposed beams 26 are provided for reinforcing the car and supporting the slidable meat hooks 27.

That portion of the refrigerating mechanism which is adapted to generate the same is carried forwardly of the trailer adjacent its forward end and near the roof thereof and includes a motor 28 which is in electrical communication through an electrical conductor 29 with the flexible electrical conduit 15.

The motor is provided with a pulley 30 and adapted to drive the fly wheel 31 of a compressor 32 by means of a belt 33.

Figure 3:
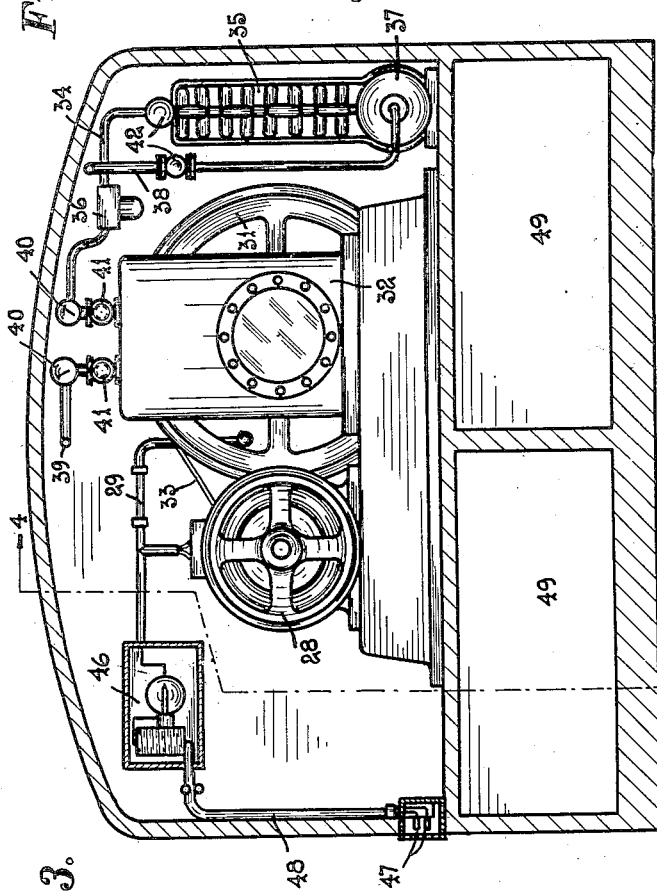
Figure 3 is a transverse sectional view taken substantially on the dotted line 3—3 of Figure 1 and showing the forward compartment of the trailer.
Figure 5:
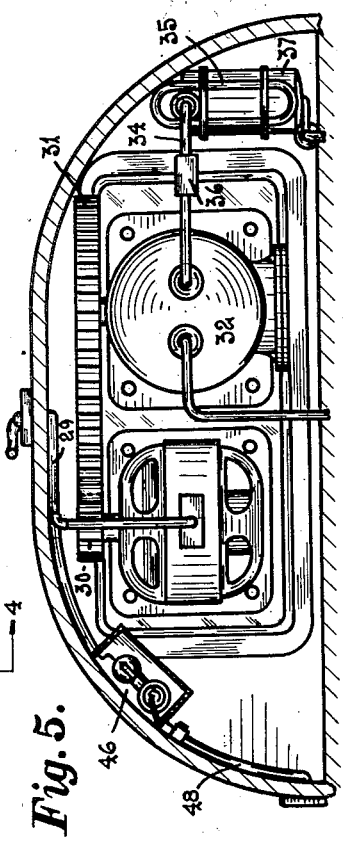
Figure 5 is a top plan view of the mechanism shown in Figure 3.

As best shown in Figure 3, the compressor is in communication, by means of a pipe 34, with a condenser 35, an oil trap 36 carried by the pipe 34 is provided therebetween the compressor and condenser. An ammonia tank 37 is placed adjacent the lower end of the condenser and is in communication with later described expansion coils and chilling units through a pipe 38 and a return pipe 39 which is in communication with the condenser 32.

Suitable gauges 40 and cut-off cocks 41 are provided upon the pipes 34 and 39 of the condenser. The pipes 34 and 38 are also provided with cut-off cocks 42.

Expansion coils 43 are provided adjacent the roof 44 of the trailer and slab-type chilling units 45 are positioned vertically within the compartments 22 and 23 and are in communication with the compressor, the ammonia tank 37 and condenser 35.

As best shown in Figure 3 an adaptor 46 is in electrical communication with the motor 28 for providing direct current thereto at times when the motor is to be energized from a source of supply of alternating current. The adaptor 46 is provided with electrical conductors having terminal ends 47 and housed within a conduit pipe 48 for insulation purposes. As best shown in Figure 3, the ends 47 of the electrical conductors are adapted to be plugged in with an alternating current circuit at times when the trailer is being loaded or unloaded at a dock and particularly at times when the trailer is disconnected from the truck as later explained.

As best shown in Figure 3 the motor 28 and compressor 32 are positioned above a plurality of unrefrigerated compartments 49 wherein valuable merchandise may be secretly stored for transportation, said compartments containing strong boxes.

In operation it will be understood that the trailer is initially positioned at a loading dock and disconnected from the truck as at a meat packing house, the latter supplying alternating current, and while the trailer is being loaded with perishable meats alternating current is connected to the adaptor carried by the trailer for a transformation thereof into direct current for a subsequent delivery of the motor for the overall purpose of generating energy for operating the refrigerating mechanism and cooling the compartments in which the meat is stored or is being stored.

After the meat compartment is loaded the said alternating current is permitted to be communicated to the adaptor, if necessary, until such time as the truck calls for the trailer and is connected thereto for a subsequent transportation of the meats and the like over the highways, the latter usually being consummated at nighttime. Similarly upon the delivery of the trailer to its destination the trailer may be connected with a source of alternating current and the truck disconnected for towing other trailers. By this means the motive power for the traveling refrigerator may be kept at work while the trailer is being loaded or unloaded, it being understood that a particular truck may be adapted in the foregoing described manner to accommodate the towing of a plurality of trucks.

Removable and adjustable means are employed in the compartments 22 and 23 for preventing meat carcasses and the like freight, pivotally suspended from the slidable hooks 27, from swinging and generating undesired vibration incident to road traveling movements of the vehicle, said means including channels provided between pairs of oppositely disposed angle irons 50 secured to the side walls of the said compartments. Between said irons and within the channels removable separators 51 are selectively positioned which are transversely disposed and extend from one side wall to the other of each compartment. The separators are suitably spaced apart for accommodating therebetween quarters, halves of beef and the like and preventing swinging movements thereof in alignment with the vehicle. As best shown in Figure 2, the top edge of the separators 51 are provided with spaced apart recesses 52 for the reception of detent pins provided adjacent the ends of bars 53 or the downturned ends of said bars which are selectively and removably placed longitudinally of the compartments between the meats for preventing swinging movements thereof transversely of the vehicle.

From the foregoing description it is thought to be obvious that a traveling refrigerator constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangements and formation of the several parts herein shown in carrying out my invention in practice except as claimed.

What is claimed is:—

1. In a traveling refrigerator, the combination with a truck having an engine, a generator, an electrical storage battery in electrical communication with the generator and a towing platform provided with a pivot, of a trailer refrigerator having a socket adapted to member with the pivot for towing the trailer and permitting turning movements of the traveling refrigerator, said trailer provided with insulated compartments for the storage of perishable merchandise during transit, refrigerating means carried by the trailer including a direct current motor, and an electrical conduit for the motor adapted to be placed in electrical communication with the battery of the truck for driving the motor and refrigerating said compartments, said conduit being of flexible construction to permit pivotal swinging movements of the truck with respect to the trailer, an adaptor on said trailer for changing alternating current into direct current, an electrical socket on the exterior of said trailer, said adaptor being so connected to said motor and electrical socket that when alternating current is applied to said electrical socket, when said trailer is disconnected from said truck, the direct current motor will be actuated and the insulated compartments in said trailer will be refrigerated.

2. In a traveling refrigerator, the combination with a truck having an engine, a generator, an electrical storage battery in electrical communication with the generator and a towing platform provided with a pivot, of a trailer refrigerator having a socket adapted to member with the pivot for towing the trailer and permitting turning movements of the traveling refrigerator, said trailer provided with insulated compartments for the storage of perishable merchandise during transit, refrigerating means carried by the trailer including a motor, and an electrical conduit for the motor adapted to be placed in electrical communication with the battery of the truck for driving the motor and refrigerating said compartments, said conduit being of flexible construction to permit pivotal swinging movements of the truck with respect to the trailer, and an adaptor carried by the trailer for receiving alternating current extraneously of the traveling refrigerator and delivering direct current to the motor for refrigerating said compartments at desired times when the truck and trailer are disconnected.

ISAAC J. CLARK.